United States Patent
Inao et al.

(10) Patent No.: US 9,522,639 B2
(45) Date of Patent: Dec. 20, 2016

(54) WIRE HARNESS AND METHOD FOR INSTALLING WIRE HARNESS IN VEHICLE

(71) Applicant: YAZAKI CORPORATION, Tokyo (JP)

(72) Inventors: Shinichi Inao, Shizuoka (JP); Hideomi Adachi, Shizuoka (JP); Takeshi Ogue, Shizuoka (JP); Tatsuya Oga, Shizuoka (JP); Masaaki Suguro, Shizuoka (JP); Yoshiaki Ozaki, Shizuoka (JP); Hiroyuki Yoshida, Shizuoka (JP); Syuhei Ejima, Shizuoka (JP); Kazuya Harakawa, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 14 days.

(21) Appl. No.: 14/695,117

(22) Filed: Apr. 24, 2015

(65) Prior Publication Data
US 2015/0224945 A1    Aug. 13, 2015

Related U.S. Application Data

(63) Continuation of application No. PCT/JP2013/080030, filed on Nov. 6, 2013.

(30) Foreign Application Priority Data

Nov. 16, 2012    (JP) .................. 2012-252380

(51) Int. Cl.
*B60R 16/02*    (2006.01)
*H02G 1/00*    (2006.01)
*H02G 3/04*    (2006.01)

(52) U.S. Cl.
CPC ....... *B60R 16/0215* (2013.01); *B60R 16/0207* (2013.01); *H02G 1/00* (2013.01); *H02G 3/0481* (2013.01); *Y10T 29/49117* (2015.01)

(58) Field of Classification Search
CPC ...... H02G 3/0406; H02G 3/32; H02G 3/0468; H02G 3/0481; H02G 3/0462; H02G 3/04; B60R 16/0215
See application file for complete search history.

(56) References Cited

U.S. PATENT DOCUMENTS 5,885,104 A    3/1999 Foster et al.
9,246,316 B2    1/2016 Oga
(Continued)

FOREIGN PATENT DOCUMENTS

CN    102035155 A    4/2011
JP    2009143326 A * 7/2009
(Continued)

OTHER PUBLICATIONS

International Search Report and Written Opinion of the International Search Report for PCT/JP2013/080030 dated Jan. 21, 2014.
(Continued)

*Primary Examiner* — Hoa C Nguyen
*Assistant Examiner* — Amol Patel
(74) *Attorney, Agent, or Firm* — Kenealy Vaidya LLP

(57) ABSTRACT

A wire harness is bent or folded at a position of a flexible part and then set to a packed state by a packing member, and in the packed state, a first installation part is set to a state of being able to be installed in a vehicle.

9 Claims, 15 Drawing Sheets

(56) References Cited

U.S. PATENT DOCUMENTS

| | | | |
|---|---|---|---|
| 2009/0167078 A1* | 7/2009 | Watanabe | H01B 7/423 |
| | | | 307/10.1 |
| 2011/0067920 A1 | 3/2011 | Toyama et al. | |
| 2011/0094796 A1* | 4/2011 | Toyama | B60R 16/0207 |
| | | | 174/72 A |
| 2011/0132638 A1 | 6/2011 | Oga et al. | |
| 2013/0248246 A1 | 9/2013 | Oga | |
| 2014/0123438 A1* | 5/2014 | Donovan | F16G 11/14 |
| | | | 24/115 N |

FOREIGN PATENT DOCUMENTS

| | | | |
|---|---|---|---|
| JP | 2010-51042 A | | 3/2010 |
| JP | 2011-97692 A | | 5/2011 |
| JP | 2011091904 A | * | 5/2011 |
| JP | 2012-125097 A | | 6/2012 |
| WO | 2007/032391 A1 | | 3/2007 |

OTHER PUBLICATIONS

International Preliminary Report on Patentability and English language Written Opinion of the International Search Report for PCT/JP2013/080030 dated May 28, 2015.

Chinese Office Action for the related Chinese patent application No. 201380060157.7 dated Apr. 25, 2016.

Japanese Office Action for the related Japanese patent application No. 2012-252380 dated Jul. 1, 2016.

* cited by examiner

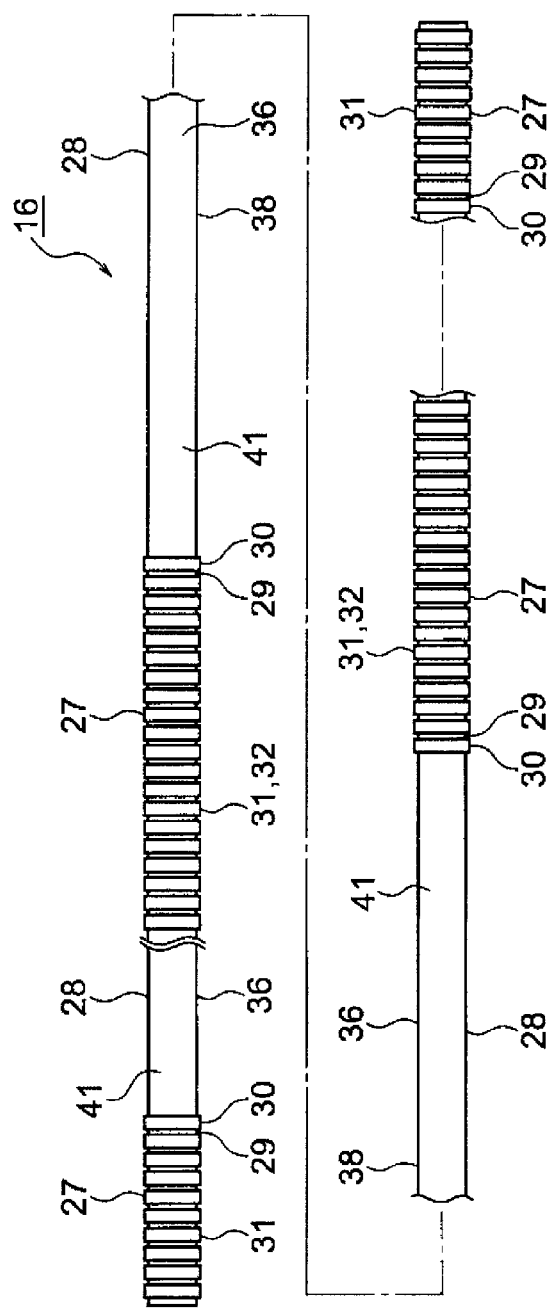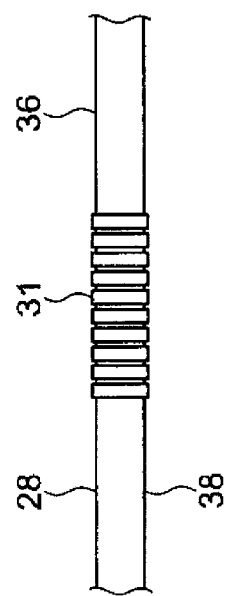
FIG. 4A
FIG. 4B

WIRE HARNESS AND METHOD FOR INSTALLING WIRE HARNESS IN VEHICLE

CROSS REFERENCE TO RELATED APPLICATIONS

This application is a continuation of PCT application No. PCT/JP2013/080030, which was filed on Nov. 6, 2013 based on Japanese Patent Application (No. 2012-252380) filed on Nov. 16, 2012, the contents of which are incorporated herein by reference.

BACKGROUND OF THE INVENTION

1. Field of the Invention

The present invention relates to a wire harness and a method for installing the wire harness in a vehicle.

2. Description of the Related Art

A high-voltage wire harness (for high voltage) is used as a member for making electrical connections among high-voltage apparatuses in a hybrid motor vehicle or an electric vehicle. The wire harness disclosed in JP-A-2010-51042 is rounded after manufacturing and accommodated in a returnable box. The wire harness is then transported in the state of being accommodated in the returnable box, and after the transportation, the wire harness is taken out from the returnable box and spread from the rounded state. After that, the wire harness is installed at a predetermined position in the state of being spread.

SUMMARY OF THE INVENTION

The wire harness according to the above-mentioned related art is taken out from a returnable box in a rounded state, is spread after it was taken out, and is installed at a predetermined position of a vehicle. The inventors of the present application think that the installation of the wire harness disclosed in the above-mentioned related art can be improved.

In consideration of the above-mentioned circumstances, an object of the present invention is to provide a wire harness and a method for installing the wire harness in a vehicle being capable of facilitating installation in the vehicle.

To attain the above-mentioned object, the wire harness and the method for installing the wire harness in a vehicle according to the present invention are characterized by below-described (1) to (9).

(1) A wire harness includes:

a first installation part that is provided as a portion to be installed first in a vehicle, a flexible part that has flexibility and is provided at an end part of the first installation part, and a sequential installation part that is provided so as to continue to the flexible part and to be installed in the vehicle after the installation of the first installation part, wherein the wire harness is bent or folded at a position of the flexible part and then set to a packed state using a packing member, and in the packed state, the first installation part is set to a state in which the first installation part can be installed in the vehicle.

The wire harness according to the above-mentioned item (1) is packed so as to be set in the compact packed state by a packing member, and in the packed state, the first installation part is set in a state of being installable in the vehicle. Hence, after transported in the packed state, the wire harness according to the above-mentioned item (1) is started to be installed in the vehicle while the packed state is maintained without once being spread. As described above, with the wire harness according to the above-mentioned item (1), the installation of the wire harness in the vehicle can be started while the packed state is maintained. Consequently, with the wire harness according to the above-mentioned item (1), the installation of the wire harness in the vehicle can be facilitated.

(2) In the wire harness according to the above-mentioned item (1), the flexible part is provided so as to be matched with a position of a through hole formed in the vehicle.

With the wire harness according to the above-mentioned item (2), after the first installation part is installed, the flexibility of the flexible parts is utilized when the wire harness is inserted into the through hole in the vehicle. Consequently, with the wire harness according to the above-mentioned item (2), the installation of the wire harness, including the insertion of the wire harness into the through hole in the vehicle, can be facilitated in addition to the effect in the above-mentioned item (1).

(3) In the wire harness according to the above-mentioned item (2), a water stop member being watertight to the flexible part and the through hole is installed on the flexible part that is provided so as to be matched with the position of the through hole.

With the wire harness according to the above-mentioned item (3), moisture is prevented from intruding through the space between the through hole and the wire harness. Consequently, with the wire harness according to the above-mentioned item (3), the wire harness can be provided with a water stopping structure (waterproofing structure) for the through hole in the vehicle in addition to the effect in the above-mentioned item (2).

(4) In the wire harness according to any one of the above-mentioned items (1) to (3), the packing member are installed so as to straddle on the first installation part and the sequential installation parts.

With the wire harness according to the above-mentioned item (4), when the wire harness is bent or folded at the position of the flexible part and packing means is used so as to straddle on the first installation part and the sequential installation parts, the wire harness being in the packed state is formed. Consequently, with the wire harness according to the above-mentioned item (4), the wire harness can be packed in a compact state in addition to the effect in any one of the above-mentioned items (1) to (3).

(5) In the wire harness according to any one of the above-mentioned items (1) to (4), lengths of the sequential installation part continuing to the flexible part is set to length so that the sequential installation part does not reach a floor of an installation working site in a state in which the first installation part is installed in the vehicle.

With the wire harness according to the above-mentioned item (5), even when the first installation part is installed in the vehicle and then the packed state is released, the sequential installation part continuing to the flexible part does not reach the floor of the installation working site. Consequently, with the wire harness according to the above-mentioned item (5), the installation can be facilitated and damage prevention can be attained in addition to the effect in any one of the above-mentioned items (1) to (4).

(6) The wire harness according to any one of the above-mentioned items (1) to (5), includes at least one conductive path and a tube body shaped exterior member made of resin into which the conductive path is inserted, and the exterior member has a flexible tube part having flexibility and an inflexible tube part having flexibility lower than that of the flexible tube part.

The wire harness according to the above-mentioned item (6) includes the conductive path and the exterior member. The exterior member is provided with the flexible tube part at a position required to be bent and the inflexible tube part at a position requiring path regulation. With the exterior member having this configuration, other members, such as protectors, are not necessary. Consequently, with the wire harness according to the above-mentioned item (6), the bending and path regulation of the wire harness can be performed using the exterior member in addition to the effect in any one of the above-mentioned items (1) to (5). Consequently, the wire harness exerts an effect capable of improving arranging performance and an effect capable of reducing the number of components in comparison with the conventional wire harness.

(7) In the wire harness according to the above-mentioned item (6), at least parts of the conductive path and the exterior member are arranged in an underfloor of the vehicle.

The wire harness according to the above-mentioned item (7) is applicable to a long wire harness formed into a length so as to pass through the vehicle underfloor and to extend from the front to the rear of the vehicle underfloor. Consequently, with the wire harness according to the above-mentioned item (7), the installation of the long wire harness can be facilitated in addition to the effect in the above-mentioned item (6).

(8) The method for installing the wire harness in the vehicle includes a first step in which the first installation part of the wire harness according to any one of the above-mentioned items (1) to (7) is installed in the vehicle, a second step in which the packed state is released after the first step, and a third step in which the sequential installation part is installed in the vehicle after the second step.

With the method for installing the wire harness in the vehicle according to the above-mentioned item (8), a portion of the first installation part of the wire harness is first installed in the vehicle while the packed state is maintained, and when the packed state is released thereafter, the other portions are sequentially installed in the vehicle. As described above, with the method for installing the wire harness in the vehicle according to the above-mentioned item (8), the installation of the wire harness in the vehicle can be started while the packed state is maintained. Consequently, with the method for installing the wire harness in the vehicle according to the above-mentioned item (8), the installation in the vehicle can be facilitated.

(9) In the method for installing the wire harness in the vehicle according to the above-mentioned item (8), in the third step, the sequential installation part is installed in the vehicle using the flexibility of the flexible part.

With the method for installing the wire harness in the vehicle according to the above-mentioned item (9), when the wire harness is inserted into the through hole in the vehicle after the first installation part was installed, the flexibility of the flexible parts is utilized. Consequently, with the method for installing the wire harness in the vehicle according to the above-mentioned item (9), the installation of the wire harness, including the insertion of the wire harness into the through hole in the vehicle, can be facilitated in addition to the effect in the above-mentioned item (8).

BRIEF DESCRIPTION OF THE DRAWINGS

FIGS. 4A and 4B are views showing modifications of the exterior member;

MODE FOR CARRYING OUT THE INVENTION

After being manufactured, a wire harness according to the present invention is packed in a compact state, and after being transported in this packed state, the wire harness is started to be installed in a vehicle while the packed state is maintained without once being spread.

First Embodiment

Figure 1:
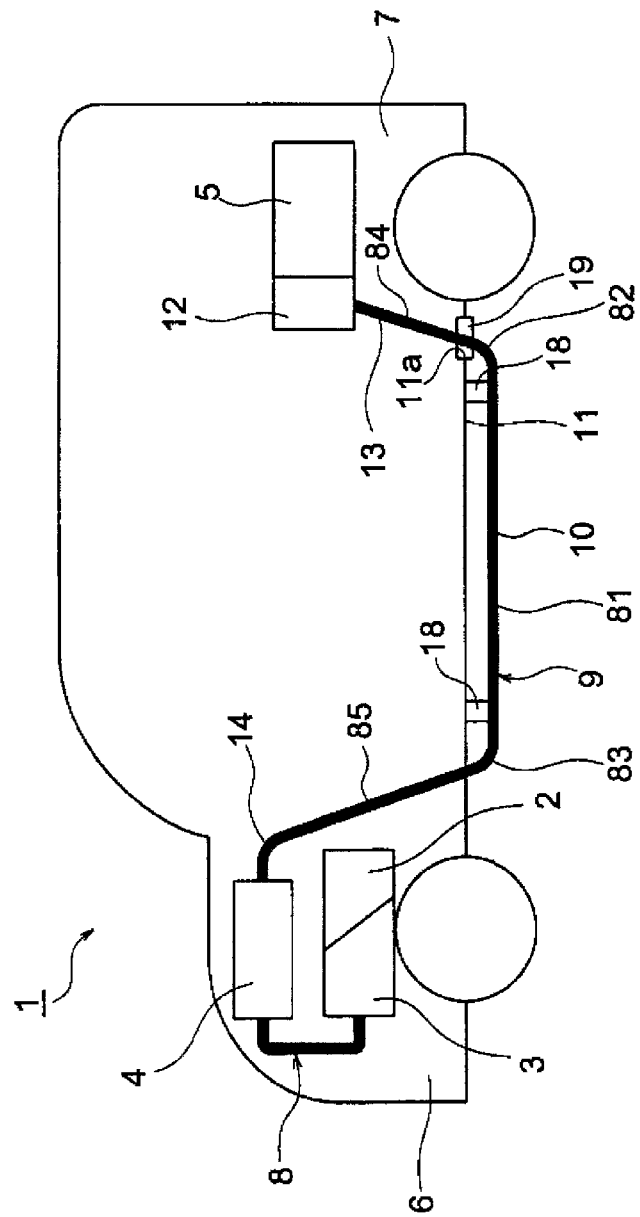
FIG. 1 is a schematic view showing a wired state of a wire harness according to a first embodiment.
Figure 2:
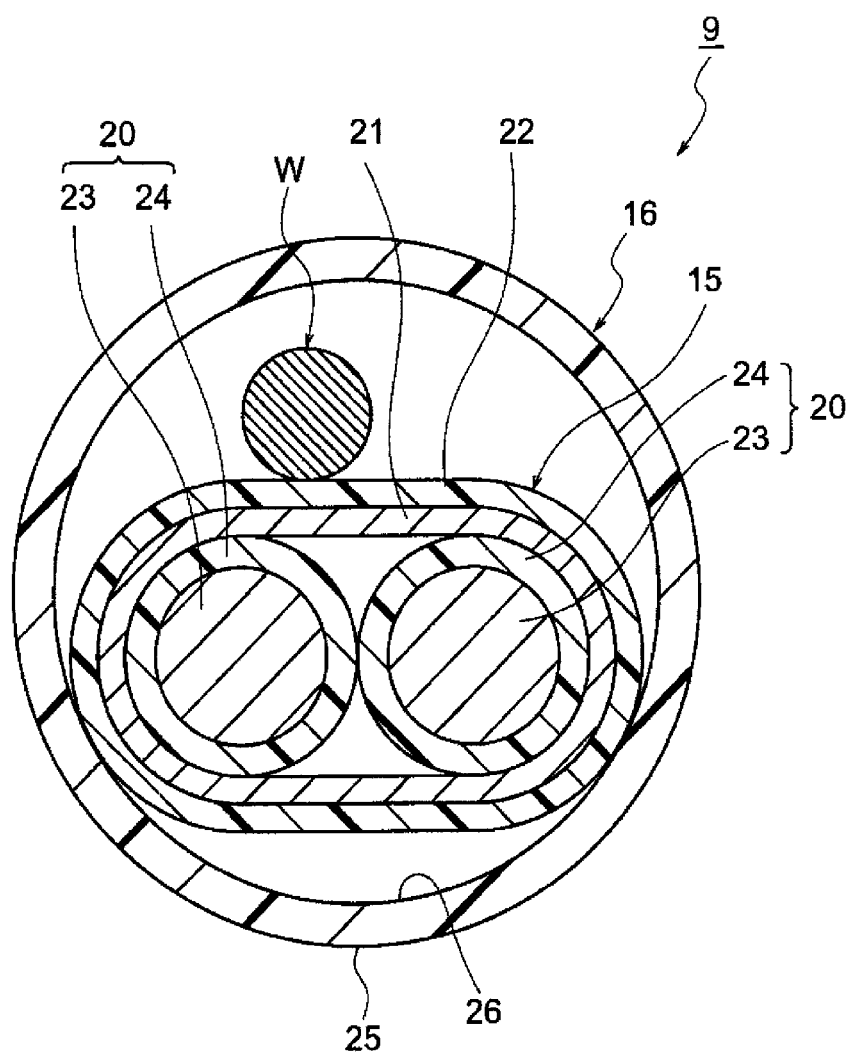
FIG. 2 is a cross-sectional view showing the wire harness.
Figure 3:
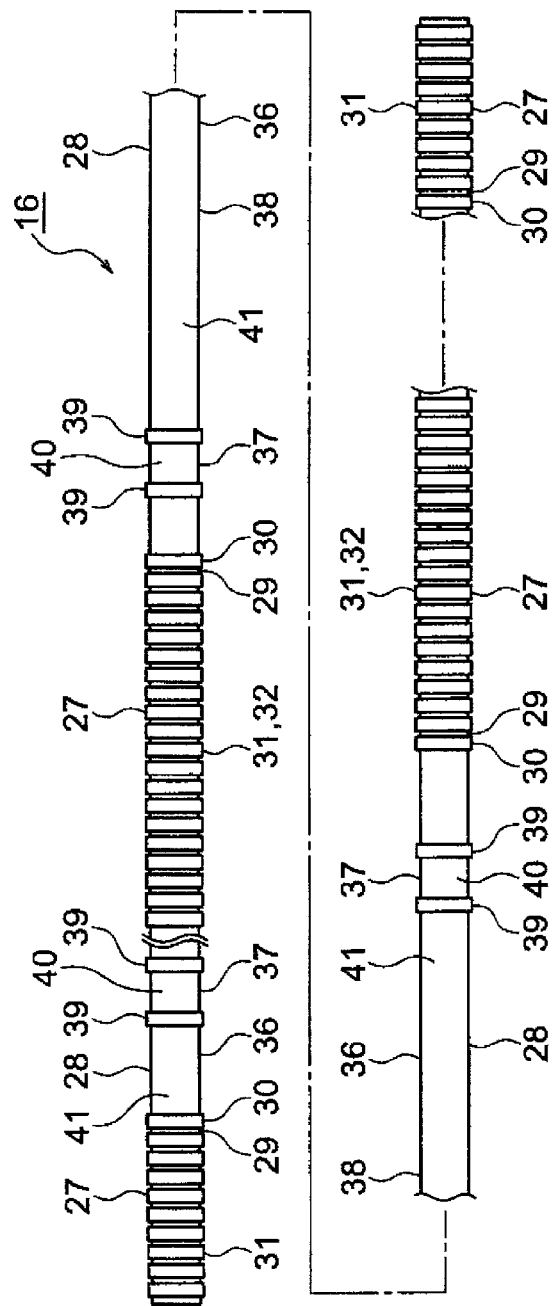
FIG. 3 is a view showing a configuration of an exterior member.
Figure 5:
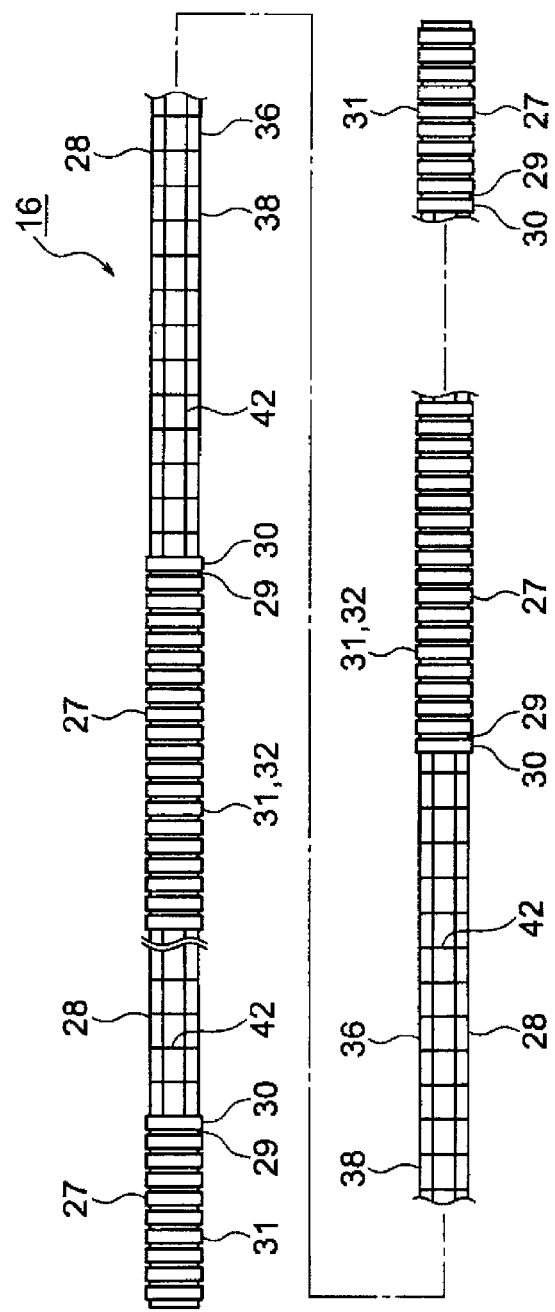
FIG. 5 is a view showing another modification of the exterior member.
Figure 6:
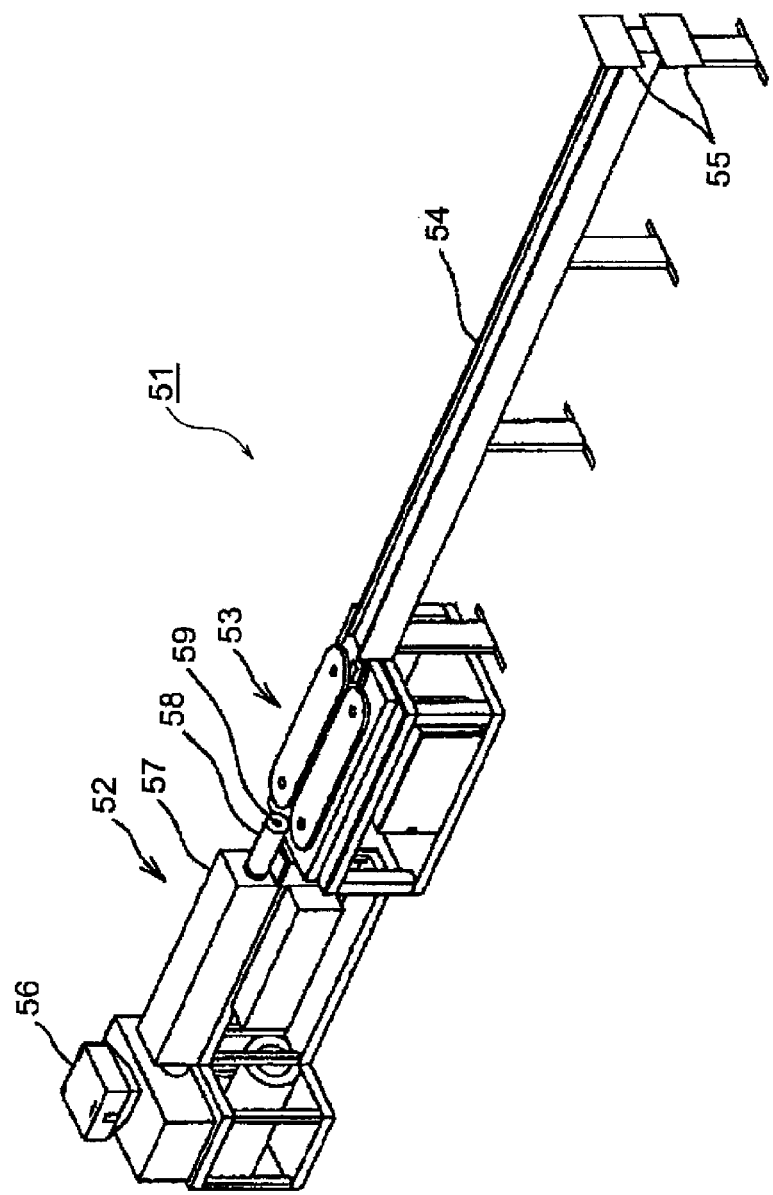
FIG. 6 is a perspective view showing a manufacturing device for manufacturing the exterior member.
Figure 7:
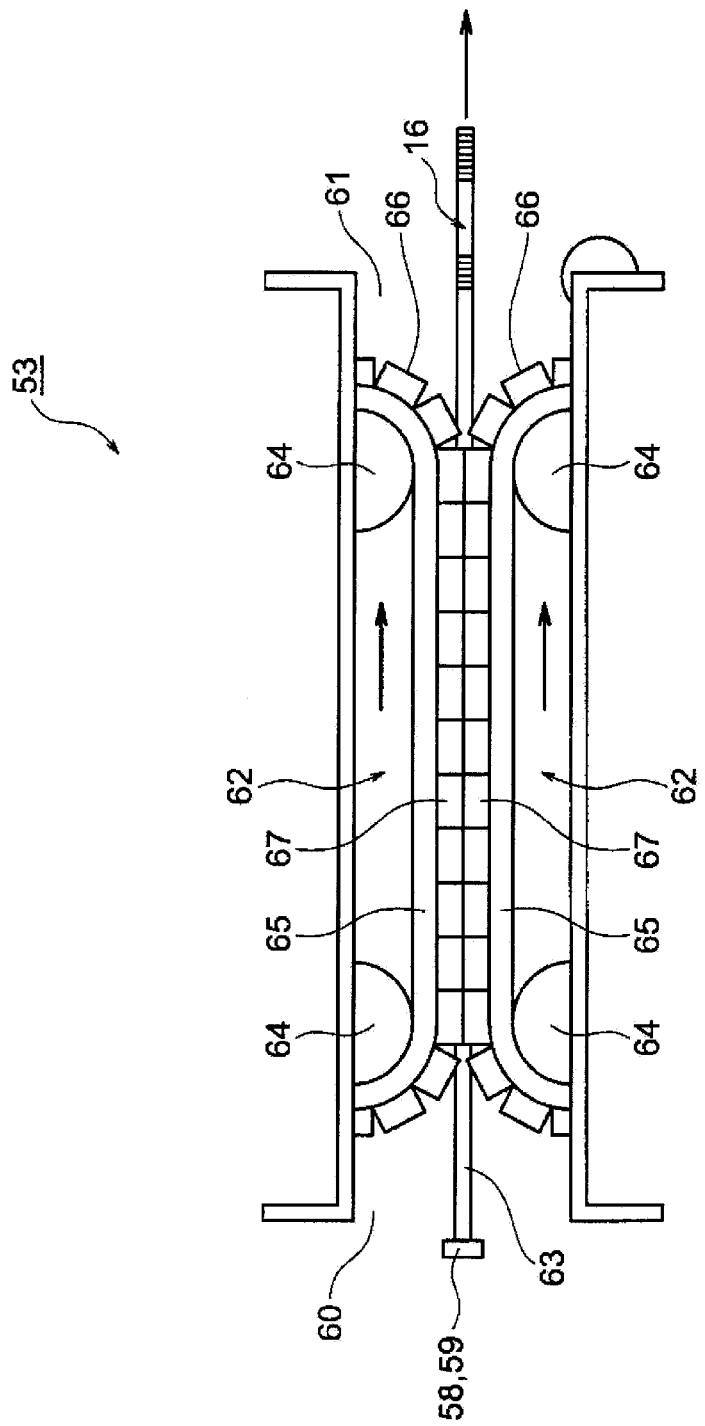
FIG. 7 is a plan view showing main parts of a manufacturing device shown in FIG. 6.
Figure 8:
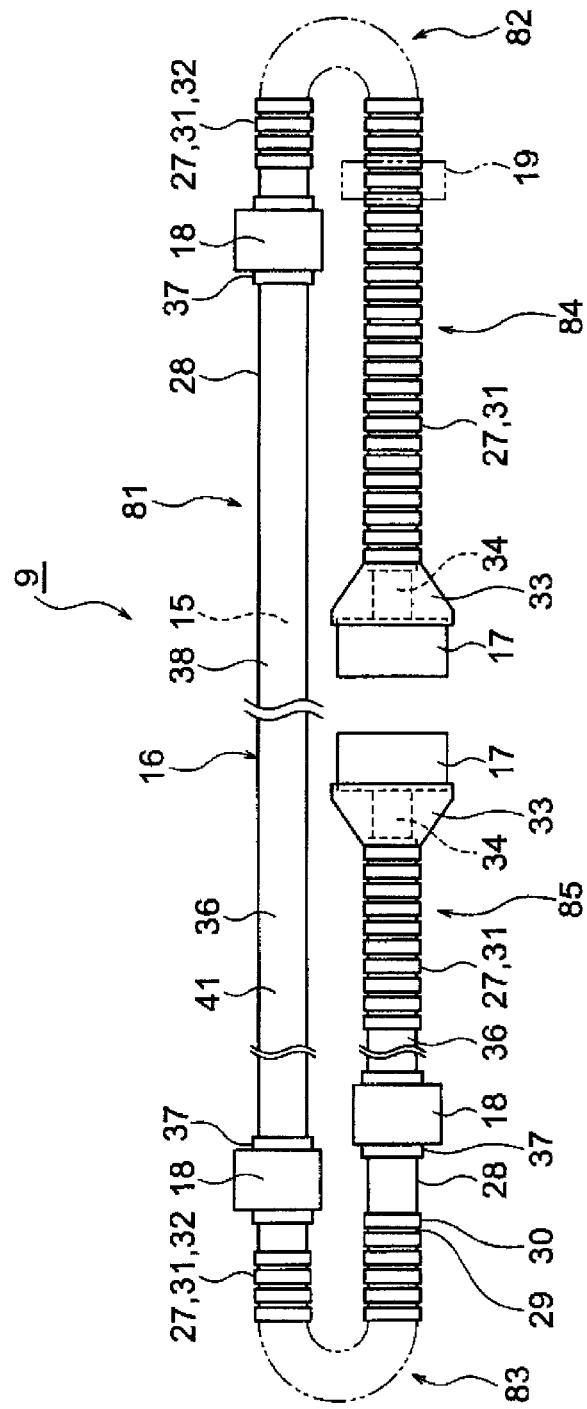
FIG. 8 is a view showing the wire harness being in the state before transportation.
Figure 9:
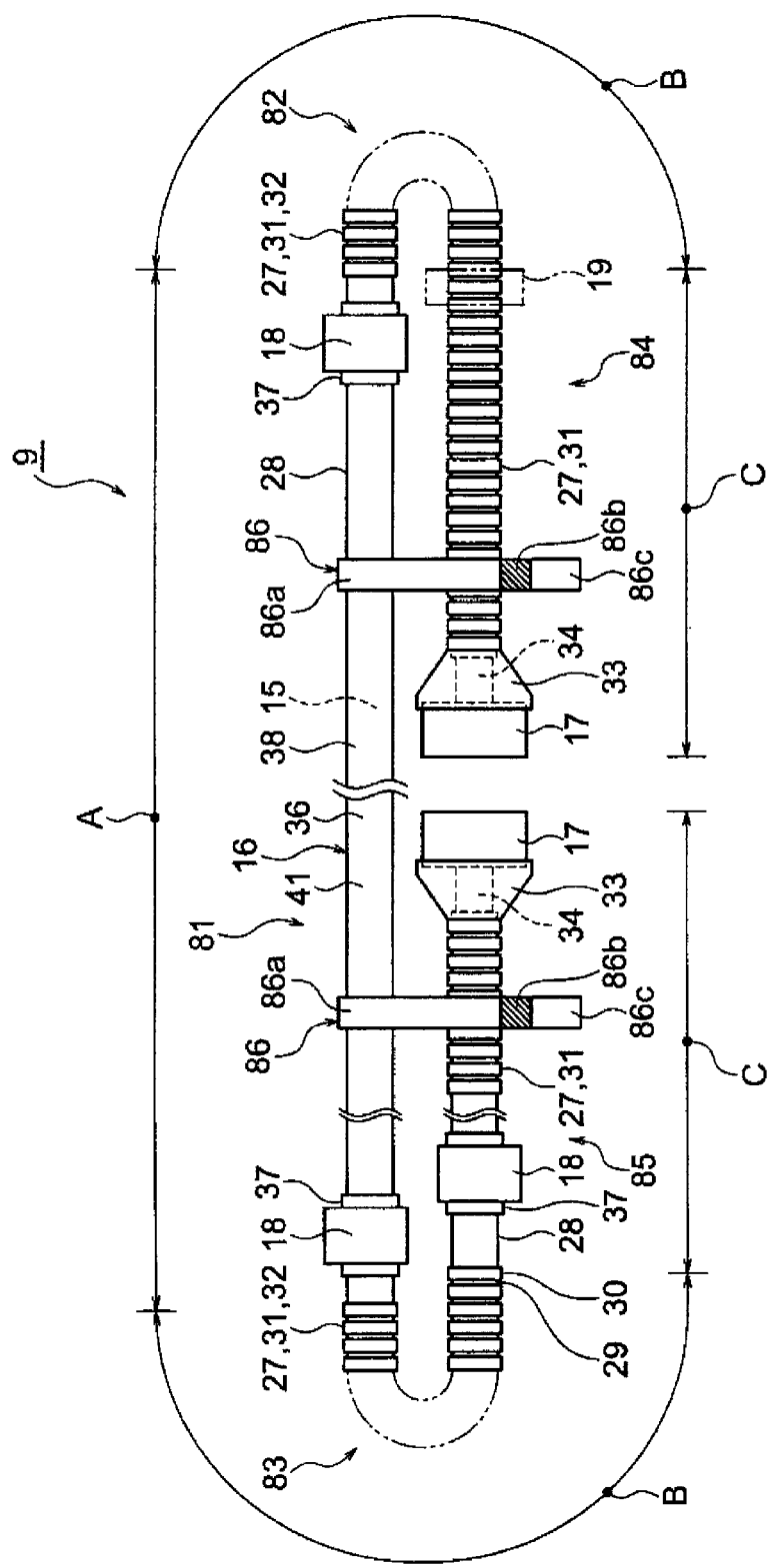
FIG. 9 is a view showing the wire harness being in the packed state and in the state during transportation.
Figure 10:
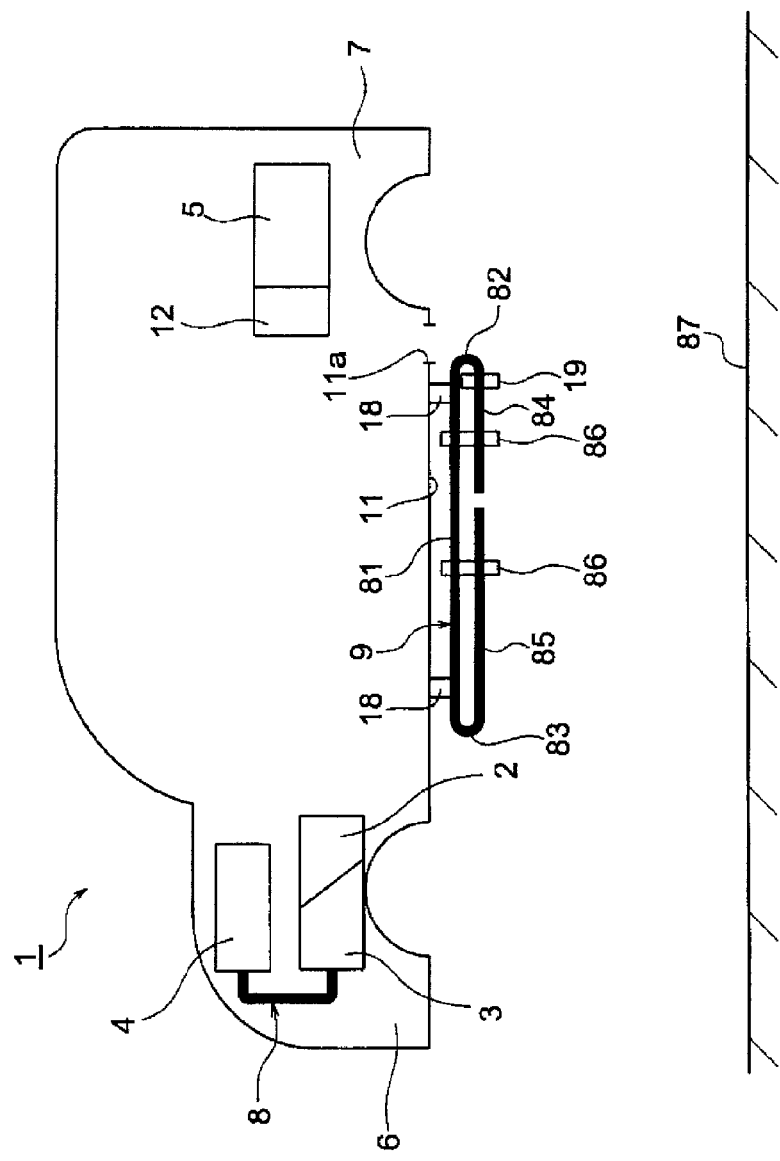
FIG. 10 is a view showing a first step in which the wire harness is installed in a vehicle.
Figure 11:
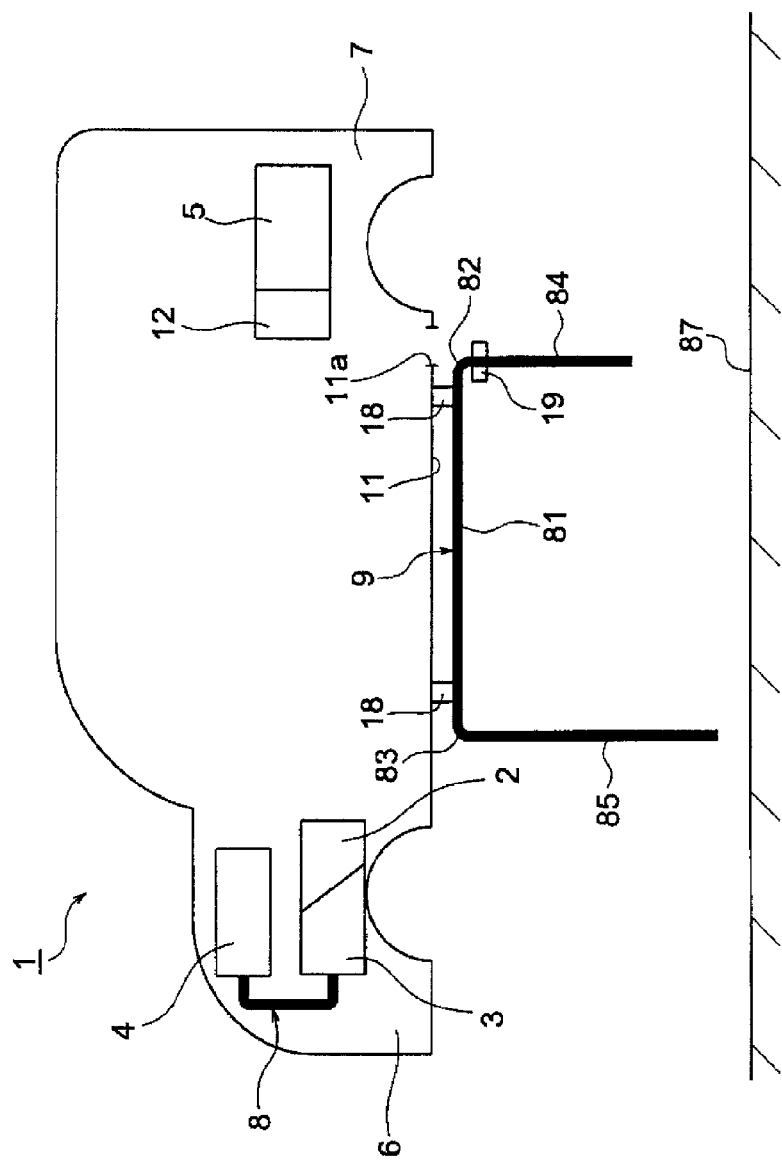
FIG. 11 is a view showing a second step in which the packed state of the wire harness is released.
Figure 12:
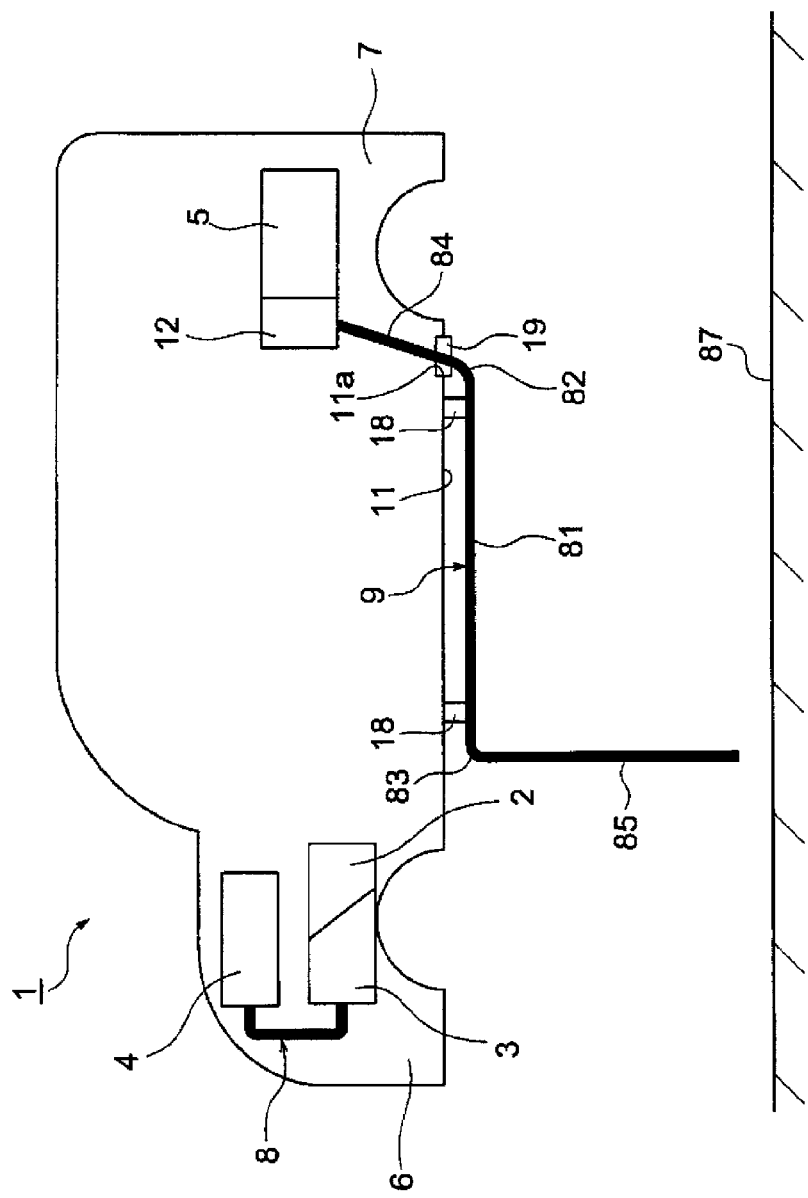
FIG. 12 is a view showing a third step in which a sequential installation part of the wire harness is installed.
Figure 13:
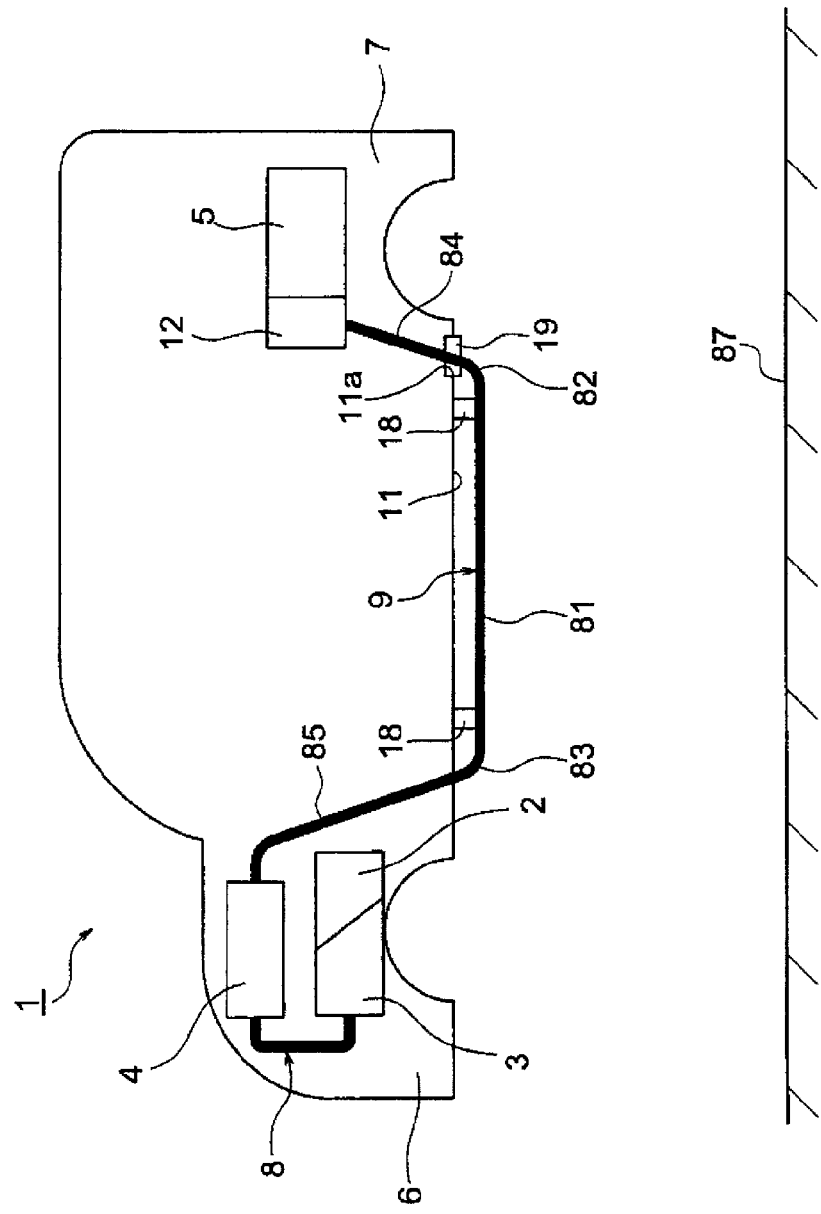
FIG. 13 is a view showing the third step in which another sequential installation part of the wire harness is installed.

A first embodiment of a wire harness according to the present invention will be described below referring to FIGS. 1 to 13. FIG. 1 is a schematic view showing a wired state of the wire harness according to the first embodiment. Furthermore, FIG. 2 is a cross-sectional view showing the wire harness; FIG. 3 is a view showing a configuration of an exterior member; FIGS. 4A, 4B and 5 are views showing modifications of the exterior member; FIG. 6 is a perspective view showing a manufacturing device for manufacturing the exterior member; FIG. 7 is a plan view showing main parts of the manufacturing device shown in FIG. 6; FIG. 8 is a view showing the wire harness being in the state before transportation; FIG. 9 is a view showing the wire harness being in the packed state and in the state during transportation; FIG. 10 is a view showing a first step in which the wire harness is installed in a vehicle; FIG. 11 is a view showing a second step in which the packed state of the wire harness is released; and FIGS. 12 and 13 are views showing a third step in which the sequential installation parts of the wire harness are installed.

An example in which the present invention is applied to a wire harness to be arranged in a hybrid motor vehicle (an electric vehicle or an ordinary motor vehicle may be used) is taken and described in the first embodiment.

In FIG. 1, reference numeral 1 designates a hybrid motor vehicle. The hybrid motor vehicle 1 is a vehicle driven by two mixed drive power sources, i.e., an engine 2 and a motor unit 3. Electric power is supplied to the motor unit 3 from a battery 5 (i.e., a battery pack) via an inverter unit 4. In this example, the engine 2, the motor unit 3 and the inverter unit 4 are mounted in the engine room 6 positioned close to the front wheels. In addition, the battery 5 is mounted in the rear part 7 of the motor vehicle close to the rear wheels. However, the battery 5 may be mounted inside the passenger compartment provided behind the engine room 6.

The motor unit 3 is electrically connected to the inverter unit 4 by a high-voltage wire harness 8. Furthermore, the battery 5 is also electrically connected to the inverter unit 4 by a high-voltage wire harness 9. The intermediate part 10 of the wire harness 9 is arranged in a vehicle underfloor 11. Furthermore, the wire harness 9 is arranged nearly parallel to the vehicle underfloor 11. The vehicle underfloor 11 is a known body, that is, the so-called panel member, and is provided with a through hole 11a at a predetermined position. The wire harness 9 is inserted into the through hole 11a water-tightly.

The wire harness 9 is electrically connected to the battery 5 via a junction block 12 provided on the battery 5. The rear end 13 of the wire harness 9 is electrically connected to the junction block 12 by a known method. The front end 14 of the wire harness 9 is electrically connected to the inverter unit 4 by a known method.

The motor unit 3 has a motor (not shown) and a generator (not shown). Furthermore, the inverter unit 4 has an inverter (not shown) and a converter (not shown). The motor unit 3 is formed as a motor assembly including a shield case (not shown). Moreover, the inverter unit 4 is also formed as an inverter assembly including a shield case (not shown). The battery 5 is a Ni-MH or Li-ion battery and is modularized. However, for example, a power storage device, such as a capacitor, can also be used. The battery 5 is not particularly limited, provided that it can be used for the hybrid motor vehicle 1 and an electric vehicle.

First, the configuration and structure of the wire harness 9 will be described.

As shown in FIG. 2, the wire harness 9 is equipped with a high voltage conductive path 15 (i.e., a conductive path), an exterior member 16 for incorporating and protecting this high voltage conductive path 15, shielded connectors 17 (i.e., connection members; see FIG. 8) provided at ends of the high voltage conductive path 15, a plurality of clamps 18 (i.e., fixing members; see FIG. 8) installed on the outer surface of the exterior member 16, and a grommet 19 (i.e., a water stop member; see FIGS. 1 and 8) also installed on the outer surface of the exterior member 16 water-tightly.

The wire harness 9 may also be configured such that a low-tension conductive path is accommodated in and protected by the exterior member 16 together with the high voltage conductive path 15. In this case, the low-tension conductive path is disposed, for example, at the position indicated by reference letter W in FIG. 2.

The high voltage conductive path 15 is equipped with two high voltage circuits 20, a shield member 21 for covering these two high voltage circuits 20, and a sheath 22 provided outside the shield member 21. This configuration of the high voltage conductive path 15 is an example.

The high voltage circuit 20 is herein a known high voltage wire and is equipped with a conductor 23 and an insulator 24 for covering this conductor 23. The high voltage circuit 20 has a length required for electrical connection. The high voltage circuit 20 is formed into a longitudinal shape since the wire harness 9 electrically connects the inverter unit 4 to the battery 5 (in other words, the junction block 12) (see FIG. 1).

The conductor 23 is made of copper or a copper alloy, or aluminum or an aluminum alloy. The conductor 23 may have a conductor structure in which strands are twisted or a bar-shaped conductor structure having a rectangular or circular cross-sectional shape (for example, a rectangular single-core or circular single-core conductor structure; in this case, the wire itself also has a bar shape). The conductor 23 having the above-mentioned configuration is formed by a method in which the insulator 24 made of an insulating resin material is extrusion-molded on the outside surface thereof.

Although the configuration of a known high voltage wire is adopted as that of the high voltage circuit 20 in the first embodiment, the high voltage circuit 20 is not limited to have this configuration. In other words, for example, a high voltage circuit formed of a known bus bar provided with an insulator may also be adopted as the high voltage circuit 20.

The shield member 21 is an electromagnetic shield member (i.e., an electromagnetic wave countermeasure shield member) for covering the two high voltage circuits 20 together, and a known braid formed by knitting numerous strands into a tubular shape is adopted. The shield member 21 is formed so as to have a length almost the same as the total length of the two high voltage circuits 20. An end portion of the shield member 21 is electrically connected to the shield case or the like (not shown) of the inverter unit 4 (see FIG. 1) via the above-mentioned shielded connectors 17 (see FIGS. 8 and 9).

For example, metal foil having conductivity or a member containing this metal foil may also be adopted as the shield member 21, provided that countermeasures against electromagnetic waves can be taken.

The sheath 22 is formed by extrusion-molding a resin material having an insulation property on the outside of the shield member 21 so as to have a predetermined thickness and is disposed at the position of the outermost layer of the high voltage conductive path 15. In the manufacturing of the wire harness 9, each end of the sheath 22 is processed so that a predetermined length of the shield member 21 is exposed. After the end processing, the sheath 22 is slightly longer than the exterior member 16, for example.

Figure 15:
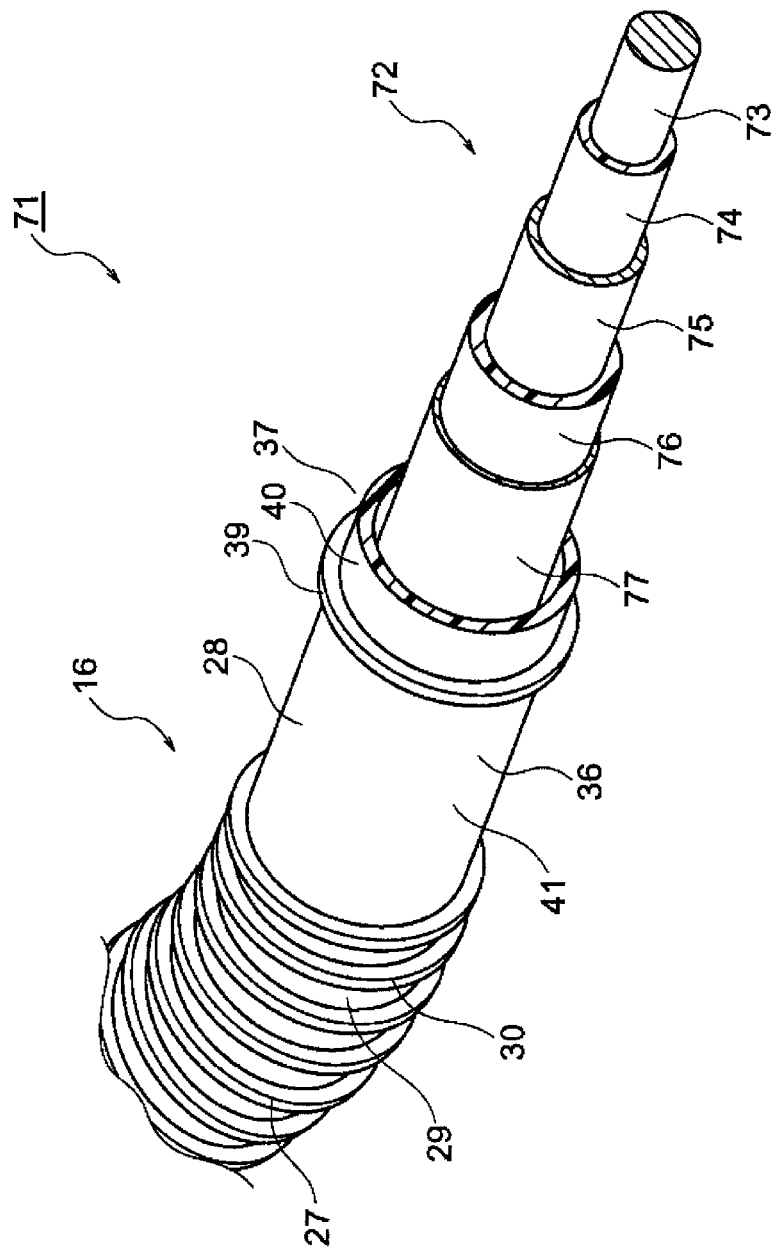
FIG. 15 is a perspective cross-sectional view showing a wire harness according to a third embodiment.

With respect to the conductive path, other than the high voltage conductive path 15, a high voltage coaxial complex conductive path 72, described later referring to FIG. 15, is taken as an example. Furthermore, with respect to the conductive path, for example, known shield wires are also taken as examples. The number of the conductive paths may be at least one or may be plural.

In FIGS. 2 and 3, the exterior member 16 is a resin tube for covering the above-mentioned high voltage conductive path 15 and is formed into a shape having a length required for the accommodation of the high voltage conductive path 15 and a thickness required for the protection thereof. Furthermore, the exterior member 16 is formed into a shape not provided with joints or slits communicating from the outer surface 25 to the inner surface 26 thereof. The exterior member 16 is formed into a shape capable of keeping the high voltage conductive path 15 away from moisture (in other words, waterproofing) and is also formed into a longitudinal shape.

In the first embodiment, the exterior member 16 is formed into a circular cross-sectional shape. This cross-sectional shape of the exterior member 16 is an example. As in a second embodiment described later, the cross-sectional shape of the exterior member 16 may be an elliptical shape, an oval shape or a rectangular shape. The exterior member 16 has a plurality of flexible tube parts 27 having flexibility and a plurality of inflexible tube parts 28 having no such flexibility as the flexible tube parts 27 (in other words, smaller in flexibility than the flexible tube parts 27) and is formed into, for example, the shape shown in FIG. 3.

The flexible tube parts 27 and the inflexible tube parts 28 are integrally resin-molded so as to be formed into a linear shape as a whole in a state in which the flexible tube parts 27 are not bent. The flexible tube parts 27 and the inflexible tube parts 28 are disposed so as to continue alternately in the axial direction of the tube.

The flexible tube parts 27 are disposed at positions conforming to the installation shape in the vehicle (in other words, the shape at the arranging destination of the wire harness, i.e., the shape of an object to which the wire harness is fixed). Furthermore, the flexible tube parts 27 are also formed so as to have lengths conforming to the installation shape in the vehicle. The wire harness can be bent so as to have the required lengths conforming to the installation shape in the vehicle by making the lengths of the plurality of flexible tube parts 27 in the axial direction of the tube different from one another. The flexible tube parts 27 having the above-mentioned configuration can be bent respectively to desired angles when the wire harness 9 is set to its packed state as described later, when the wire harness is transported and when the wire harness is arranged into the vehicle (see FIGS. 8 to 13).

The flexible tube parts 27 can be bent and formed into curved shapes and can also be returned to the original straight shape as a matter of course.

The flexible tube parts 27 are formed into a bellows tube shape in the first embodiment. However, the shape of the flexible tube parts 27 is not limited particularly, provided that they have flexibility. More specifically, the flexible tube parts 27 are formed so as to have recessed parts 29 and protruding parts 30 extending in the radial direction and so that the recessed parts 29 and the protruding parts 30 continue alternately in the axial direction of the tube.

The flexible tube part 27 includes a flexible tube part 31 for the arrangement of the path which is bent during the arrangement of the path and a flexible tube part 32 for the packing and the transportation which is bent under a packed state and during the transportation of the wire harness 9. The flexible tube part 27 may be arranged and formed in a part which does not need to be bent.

The exterior member 16 is formed into a shape such that the flexible tube part 27 is disposed on the side of each end thereof. In addition, the exterior member 16 is formed so that the end part of the flexible tube part 27 disposed on the side of the end thereof has the length extending to a position in the vicinity of the shielded connector 17 (see FIG. 8). The position in the vicinity of the shielded connector 17 is a position being close thereto to the extent that the work for the electrical connection of the shielded connector 17 to, for example, the inverter unit 4 (see FIG. 1) is not obstructed or a position being close thereto to the extent that the end processing of the high voltage conductive path 15 is not obstructed. Having flexibility as described above, the flexible tube part 27 can be extended fairly close to the shielded connector 17.

The above-mentioned electrical connection work involves bending. Hence, in consideration of a case in which the inflexible tube part 28 is disposed instead of the flexible tube part 27, the end part of the inflexible tube part 28 may be away from the shielded connector 17. If the end part is away apart from the shielded connector 17, the degree of the disclosure of the end part 34 of the high voltage conductive path 15 described later becomes large. For this reason, it is effective to dispose the flexible tube part 27 instead of the inflexible tube part 28 at a position where bending is necessary.

A flexible waterproof member extending to the shielded connector 17 (see FIG. 8) is installed in the end part of the flexible tube part 27 disposed on the side of the end. A boot 33 (see FIG. 8) made of rubber is taken as an example of the waterproof member. The boot 33 is installed to cover the end part 34 (see FIG. 8) of the high voltage conductive path 15 extended from the end part of the flexible tube part 27 and to cover the opening portion of the end part of the flexible tube part 27. The installation of the waterproof member is arbitrary and the waterproof member is not essential. A tape wound section formed by winding tape having waterproofness or the like is taken as an example of a member that is replaced with the boot 33.

Of the plurality of flexible tube parts 27 in the exterior member 16, the flexible tube part 27 disposed so as to correspond to the position of the above-mentioned through hole 11a (see FIG. 1) in the vehicle underfloor 11 is provided with a water stop member that is watertight to the outer surface thereof and also watertight to the through hole 11a. The grommet 19 (see FIGS. 1 and 8) made of rubber is taken as an example of the water stop member. The grommet 19 is installed as a member for preventing intrusion of moisture through the through hole 11a.

The exterior member 16 is formed such that the disposition portion of each flexible tube part 27 has a shape like a corrugated tube. In other words, the exterior member 16 is formed into a shape in which corrugated tubes are existent partially. Having the corrugated tube portions as described above, the exterior member 16 can be regarded as "a corrugated tube" or "a partially corrugated tube".

The exterior member 16 is formed in such a way that slits are not provided along the axial direction of the tube thereof (namely, no slits in a body). As reasons why the slits are not provided, a point may be considered that the entry of water to the exterior member 16 is prevented to improve a waterproof property. Further, a point may be also considered that the high voltage conductive path 15 is prevented from protruding in, for instance, the bent part. Further, a point may be considered that a rigidity of the exterior member 16 itself is improved. In addition thereto, the exterior member 16 is configured in the form having no joints in the circumferential direction. Reasons thereof are the same as those in the case of the above-described slits.

When the exterior member 16 can satisfy the above-described points, the exterior member 16 can be configured in such a form as to be divided in prescribed positions. In this case, the exterior member 16 is integrated by bonding or welding, or an after-attaching member for connection.

The inflexible tube part 28 has an inflexible tube part main body 36 and installation parts 37. The inflexible tube part main body 36 is formed as a portion that is not bent in the packed state described later and during transportation or during path arranging. The portion that is not bent is a portion in which flexibility is not provided positively. The inflexible tube part main body 36 is formed into a straight tube shape having a circular cross section. The cross-sectional shape of the inflexible tube part main body 36 is not limited to the above-mentioned circular cross-sectional shape, but may be an elliptical shape, an oval shape or a rectangular shape.

The inflexible tube part 28 is formed into a straight tube shape as shown in the figure. Hence, the tube parts can also be regarded as a "straight tube part" or a "straight part". The inflexible tube part 28 is formed at a portion more rigid than the flexible tube part 27. The inflexible tube part 28 is also formed so as to be located at a position and to have a length in accordance with the above-mentioned installation shape in the vehicle.

The exterior member 16 has an inflexible tube part 38 for the underfloor to be arranged in the vehicle underfloor 11 (see FIG. 1) as the inflexible tube part 28. Since the inflexible tube part 38 for the underfloor is arranged in the vehicle underfloor 11 (for example, arranged along a reinforcement member), the inflexible tube part 38 for the underfloor is formed into a longitudinal shape. The inflexible tube part 38 for the underfloor is a kind of the inflexible tube part 28, and the installation parts 37 are also formed on the inflexible tube part 38 for the underfloor at a plurality of positions.

The installation part 37 is formed as a portion in which the clamp 18 (see FIG. 8) is installed. Furthermore, the installation part 37 is formed so as to be integrated with the inflexible tube part main body 36 (in other words, integrally molded). Since the exterior member 16 is made of resin, the installation part 37 can be integrated easily therewith. The installation part 37 is provided at a portion in which the clamp 18 is required to be installed, and the installation part 37 is not provided at some of the inflexible tube parts 28. In addition, although the installation parts 37 according to the first embodiment are formed at a plurality of positions on the exterior member 16, this does not apply always.

The installation part 37 includes a pair of movement restriction parts 39 and a detachable part 40. The pair of movement restriction parts 39 is formed so as to be disposed at positions corresponding to both sides of the clamp 18 (see FIG. 8). The pair of movement restriction parts 39 is formed as portions for restricting the movement of the clamp 18 in the axial direction of the tube. Furthermore, the pair of movement restriction parts 39 is also formed as portions for recognizing the installation position of the clamp 18. The pair of movement restriction parts 39 is formed into an annular flange shape in the first embodiment. More specifically, the movement restriction parts 39 protrude from the outer surface 41 of the inflexible tube part main body 36 and are formed into a convex shape in the radial direction. This shape of the movement restriction parts 39 is an example.

It is effective to slightly widen the distance between the pair of movement restriction parts 39 at a predetermined position in order to absorb the dimensional deviation at a fixing position during path arranging. Since the slide movement of the clamp 18 (see FIG. 8) is allowed by slightly widening the distance, the above-mentioned dimensional deviation can be absorbed eventually.

In the first embodiment, the pair of movement restriction parts 39 is formed so that the protrusion height and width thereof are matched with the protrusion height and width of the protruding part 30 of the flexible tube part 27. This kind of shape of the movement restriction parts 39 is an example.

The detachable part 40 is formed as a portion in which the clamp 18 (see FIG. 8) is installed directly. The outer surface 41 being existent between the pair of movement restriction parts 39 corresponds to the detachable part 40 and is formed into a curved surface. In the case that assured rotation prevention is desired after the installation of the clamp 18, it is effective that a portion biting into the detachable part 40 having the curved surface is provided on the side of the clamp 18. In addition, it is also effective to add a rotation prevention structure having concave and convex portions or the like to the installation part 37 and the clamp 18.

Some modifications of the exterior member 16 are herein described; in the exterior member 16 shown in FIG. 4A, the inflexible tube part 28 is formed into a shape having only the inflexible tube part main body 36. In other words, the inflexible tube part 28 is formed into a shape having no installation parts 37. This kind of exterior member 16 may also be used.

Furthermore, the exterior member 16 shown in FIG. 4B is formed into a shape in which the flexible tube part 31 for the arrangement of the path is disposed in the middle of the inflexible tube parts 38 for the underfloor. This kind of exterior member 16 is effective in the case that the inflexible tube part 38 for the underfloor having a longitudinal shape is bent in the middle.

As the last modification thereof, the exterior member 16 shown in FIG. 5 is formed into a shape in which a plurality of ribs 42 are existent at least in either the axial direction of the tube (i.e., in the longitudinal direction) or the radial direction, instead of the configuration in which the installation parts 37 are not formed. The plurality of ribs 42 are formed as portions for enhancing rigidity. Furthermore, the ribs 42 are also formed as portions that are used when the clamps 18 (see FIG. 8) are installed, as portions according to which the installation positions of the clamps 18 are recognized, and as portions for preventing the rotation of the clamps 18.

The above-mentioned exterior member 16 is manufactured by the following manufacturing device and manufacturing method. The following descriptions are given referring to FIGS. 6 and 7.

In FIG. 6, reference numeral 51 indicates a manufacturing device for resin-molding the exterior member 16 (for example, see FIGS. 3 to 5). This manufacturing device 51 is equipped with a resin extruding part 52, a molding part 53, a cooling part 54, and a cutting part 55.

On the downstream side of the resin extruding part 52, the molding part 53 continues. In addition, on the downstream side of the molding part 53, the cooling part 54 continues. The cutting part 55 is disposed at the end of the cooling part 54 (in other words, at the end of the device) and operates to cut the exterior member 16 to a predetermined length.

The resin extruding part 52 includes a hopper 56 into which a resin material is supplied, an extruding part main body 57 which is horizontally extended continuously to the hopper 56, and a die 58 protruding from an end part of the extruding part main body 57. The die 58 has a resin material extruding opening 59. The resin material extruding opening 59 is arranged in an inlet 60 (see FIG. 7) of the molding part 53.

In FIG. 7, the molding part 53 is a part for performing resin molding linearly in the range from the inlet 60 to the outlet 61 thereof and has one pair of molding structure parts 62. This pair of molding structure parts 62 is arranged at both right and left sides of the flexible and tubular resin material 63 delivered from the resin extrusion outlet 59 of the die 58 (see FIG. 6), thereby being paired (see FIG. 6). The pair of molding structure parts 62 is configured so as to be able to mold the resin material 63 into a predetermined shape.

The molding structure part 62 includes one pair of timing pulleys 64 along an advancing direction of the resin material 63, an endless belt 65 that is moved by the pair of timing pulleys 64 in a direction indicated by the arrow shown in FIG. 7, and a die block assembly 66 attached on the endless belt 65 to be moved.

The die block assembly 66 has a plurality of die blocks 67. The respective die blocks 67 are arranged with no clearance therebetween at a linear part of the endless belt 65. The respective die blocks 67 are replaceably fixed to the endless belt 65.

The above-mentioned manufacturing device 51 and manufacturing method are each taken as an example. In addition to the above, a blow-type, for example, is also available.

In FIG. 8, a known clamp is used as the clamp 18 to be installed in the installation part 37.

The clamp 18 has a tube body installation part that is formed in accordance with the external shape of the inflexible tube part 28 (i.e., the external shape of the detachable part 40) and a fixing part (not shown) continuing to this tube body installation part. Bolt insertion holes (not shown) are formed in the fixing part. The wire harness 9 is installed in fixing target objects (i.e., members on the sides of wire harness arranging target objects), such as the vehicle underfloor 11 (see FIG. 11), using bolts inserted in the bolt insertion holes. When the wire harness 9 is installed in the fixing target objects, the path arranging is completed as shown in FIGS. 1 and 13.

A known shielded connector 17 is provided at each of both the ends of the wire harness 9. The shielded connector 17 on one side is a shielded connector on the side of the inverter, and the shielded connector 17 on the other side is a shielded connector on the side of the battery. The shielded connector 17 is electrically connected to the end part 34 of the high voltage conductive path 15 led out from the flexible tube part 27 and is fixed thereto. The boot 33 is installed in the area ranging from the end part of the flexible tube part 27 to the shielded connector 17.

Next, the manufacturing, packing, transportation, and path arranging of the wire harness 9 will be described. In the manufacturing process of the wire harness 9, first, the high voltage conductive path 15 is inserted into the exterior member 16 that has been molded in a nearly linear shape as a whole, and then the shielded connectors 17 are provided at the end parts 34 of the high voltage conductive path 15. Next, the clamps 18 are installed in accordance with the positions of the installation parts 37. And then, the boots 33 and the grommet 19 are installed at the predetermined positions on the outer surface of the exterior member 16. The manufacturing of the wire harness 9 is completed by performing the above-mentioned process.

After the manufacturing of the wire harness 9, when the wire harness 9 is bent so as to be folded at the portions of the predetermined flexible tube parts 27 as shown in FIG. 8, the inflexible tube parts 28 (the inflexible tube part 28 and the inflexible tube parts 38 for the underfloor in FIG. 8) of the wire harness 9, for example, are disposed so as to be nearly parallel to each other. More specifically, the other inflexible tube part 28 is disposed along and in nearly parallel to the inflexible tube parts 38 for the underfloor having a longitudinal shape. In this state, the total length of the wire harness 9 becomes short, and the wire harness 9 has the minimum width. In other words, the wire harness 9 becomes compact.

The portion indicated by a range A in which the inflexible tube part 38 for the underfloor is located corresponds to a first installation part 81. This first installation part 81 is provided as a portion that is first installed in the vehicle. Furthermore, the portions indicated by ranges B in which the folded flexible tube parts 27 are located correspond to flexible parts 82 and 83. These flexible parts 82 and 83 are provided as flexible portions disposed at both the end parts of the first installation part 81. Moreover, the portions indicated by ranges C extending from the flexible parts 82 and 83 to the shielded connectors 17 correspond to sequential installation parts 84 and 85. These sequential installation parts 84 and 85 are provided as portions that are installed sequentially after the installation of the first installation part 81. Although the case in which the two sequential installation parts 84 and 85 are provided has been described in the first embodiment, one sequential installation part may also be used.

In FIG. 9, two belt-shaped hook-and-loop fasteners 86 (i.e., packing members) are used to bind the first installation part 81 and the sequential installation parts 84 and 85 so as to straddle on them, whereby the wire harness 9 is brought into its packed state, and the wire harness 9 can be transported in the compact state. Since only the hook-and-loop fasteners 86 are used at this step, the packing of the wire harness 9 is easy. However, packing materials are not limited to the hook-and-loop fasteners 86. Furthermore, the above-mentioned number of the hook-and-loop fasteners 86 to be used is an example. The wire harness 9 packed using the hook-and-loop fasteners 86 is in a state in which the first installation part 81 is exposed.

The hook-and-loop fastener 86 has a winding part 86a, an attaching/detaching part 86b and an extension part 86c; when the extension part 86c is held and pulled in a predetermined direction, the attaching/detaching part 86b can be detached easily. In other words, the hook-and-loop fastener 86 is formed so that the packed state is easily released. In addition, the hook-and-loop fastener 86 is also formed so as to be usable repeatedly.

The wire harness 9 is transported in the above-mentioned packed state. After the transportation, the wire harness 9 is installed in the vehicle while the packed state is maintained. The installation of the wire harness 9 in the vehicle will be described below.

In FIG. 10, after the transportation, the wire harness 9 being in the packed state is carried to the lower side of the vehicle underfloor 11 while the packed state is maintained. Then, while the wire harness 9 is in a state of being lifted by a worker, the first installation part 81 is first installed in the vehicle (i.e., first step).

The first installation part 81 is installed in the vehicle underfloor 11 using the clamps 18. After the installation of the first installation part 81, the hook-and-loop fasteners 86, 86 are detached, whereby the packed state of the wire harness 9 is released (i.e., second step).

In FIG. 11, when the packed state is released, the sequential installation parts 84 and 85 hang down (in other words, they can hang down) toward the floor 87 of the installation working site because the flexible parts 82 and 83 continue to both end parts of the first installation part 81. It is herein assumed that the lengths of the sequential installation parts 84 and 85 are set to lengths not reaching the floor 87 of the installation working site.

Since the tip ends of the sequential installation parts 84 and 85, more specifically, the shielded connectors 17 (see FIG. 8), do not reach the floor of the installation working site, the wire harness 9 is not damaged. In other words, the installation work of the wire harness 9 can be continued without paying attention to damages or the like.

Referring to FIG. 12, in the first embodiment, the installation of the sequential installation part 84 on the rear side is performed (i.e., third step). First, the sequential installation part 84 is inserted into the through hole 11a and electrically connected to the junction block 12, and the grommet 19 is water-tightly installed into the through hole 11a. This completes a series of installation steps on the side of the sequential installation part 84. The above-mentioned insertion of the sequential installation part 84 is facilitated by the existence of the flexible part 82 having flexibility.

As the last step, the installation on the front side is performed (i.e., third step); when the electrical connection and the like to the inverter unit 4 are performed as shown in FIG. 13, a series of installation steps on the side of the sequential installation part 85 is completed. In addition, the path arranging of the wire harness 9 is also completed.

As having been described above referring to FIGS. 1 and 13, with the present invention, the installation of the wire harness 9 can be started while the packed state is maintained, whereby the installation of the wire harness in the vehicle can be made easier than the installation of the conventional wire harness.

Second Embodiment

Figure 14A:
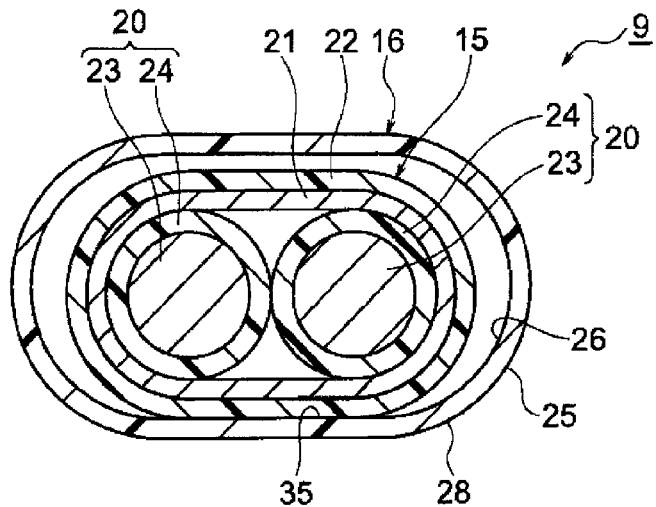
FIGS. 14A to 14C are cross-sectional views showing a wire harness according to a second embodiment.
Figure 14B:
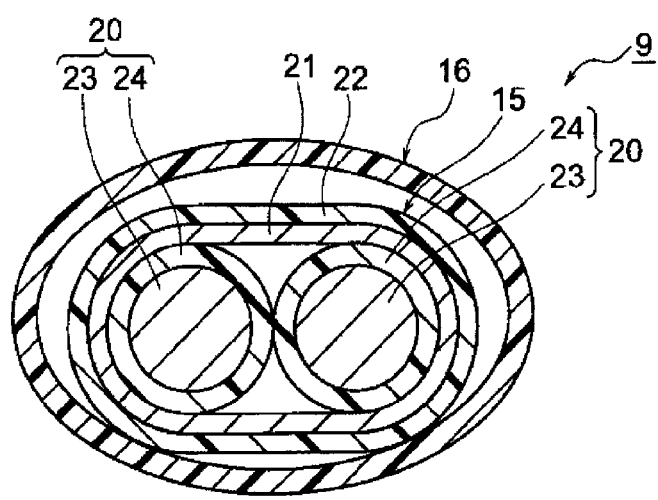
Figure 14C:
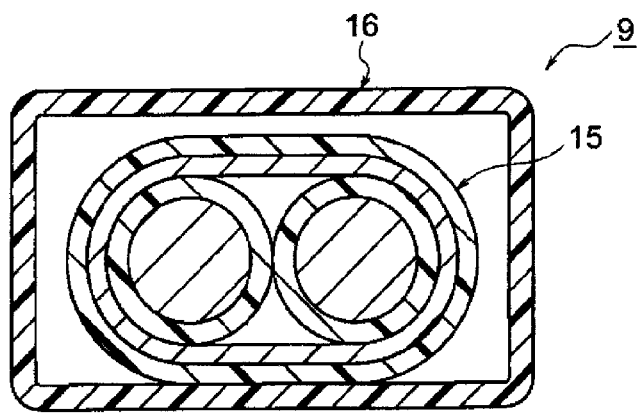

A second embodiment of a wire harness according to the present invention will be described below referring to FIGS. 14A to 14C. FIGS. 14A to 14C are cross-sectional views showing the wire harness according to the second embodiment. The basically same components as those in the above-mentioned first embodiment are designated by the same reference numerals and their detailed descriptions are omitted. Furthermore, the wire harness according to the second embodiment is used so that it is arranged similarly as the wire harness according to the first embodiment.

In FIGS. 14A to 14C, the wire harness 9 is equipped with a high voltage conductive path 15, an exterior member 16 for incorporating and protecting this high voltage conductive path 15 and shielded connectors 17 (see FIG. 8) provided at the ends of the high voltage conductive path 15. The exterior member 16 is formed into an oval cross-sectional shape or an elliptical cross-sectional shape (i.e., a flat shape) in accordance with the external shape of the high voltage conductive path 15, instead of the circular cross-sectional shape in the first embodiment. Alternately, the exterior member 16 is formed into a rectangular cross-sectional shape.

Since the exterior member 16 is formed into an oval cross-sectional shape, an elliptical cross-sectional shape or a rectangular cross-sectional shape, the height dimension thereof becomes lower than that in the first embodiment, and when the wire harness 9 is installed in the vehicle underfloor 11 (see FIG. 1), the distance of the wire harness to the ground can be increased. Furthermore, since the exterior member 16 is formed into an oval cross-sectional shape, an elliptical cross-sectional shape or a rectangular cross-sectional shape, the occupancy of the high voltage conductive path 15 in the internal space can be raised, whereby the heat of the high voltage conductive path 15 can be transmitted easily to the exterior member 16.

In facilitating the transmission of the heat to the exterior member 16, the exterior members 16 having such flat surfaces as shown in FIGS. 14A and 14C are more effective. This is because the contact area between the exterior member 16 and the high voltage conductive path 15 becomes larger.

The wire harness 9 including the exterior member 16 having the above-mentioned cross-sectional shape in the configuration thereof exerts an effect similar to that of the first embodiment as a matter of course.

Third Embodiment

A third embodiment of a wire harness according to the present invention will be described below referring to FIG. 15. FIG. 15 is a cross-sectional perspective view showing the wire harness according to the third embodiment. The basically same components as those in the above-mentioned first embodiment are designated by the same reference numerals and their detailed descriptions are omitted. Furthermore, the wire harness according to the third embodiment is arranged similarly as the wire harness according to the first embodiment.

In FIG. 15, a wire harness 71 is equipped with a high voltage coaxial complex conductive path 72 serving as a high voltage conductive path, an exterior member 16 for incorporating and protecting this high voltage coaxial complex conductive path 72, and shielded connectors, not shown, provided at the ends of the high voltage coaxial complex conductive path 72.

The high voltage coaxial complex conductive path 72, a single path, is configured so as to have a plus circuit and a minus circuit. In other words, the high voltage coaxial complex conductive path 72 is configured so as to have two systems of circuits. More specifically, the high voltage coaxial complex conductive path 72 has a first conductive path 73 having a circular cross-sectional shape and positioned at the center of the high voltage coaxial complex conductive path 72, a first insulator 74 for covering the outer circumference of the first conductive path 73 with a predetermined thickness, a second conductive path 75 provided outside the first insulator 74, a second insulator 76 for covering the outer circumference of the second conductive path 75 with a predetermined thickness, and a tubular shield member 77 tightly making contact with the outer surface of the second insulator 76. The high voltage coaxial complex conductive path 72 may further include a sheath for covering the outer circumference of the shield member 77 with a predetermined thickness.

The shield member 77 is made of a known braid, metal foil, etc. and may be disposed as described below, instead of being disposed so as to be included in the configuration of the high voltage coaxial complex conductive path 72 as described above. That is to say, the shield member 77 may be disposed in a slightly loose state with respect to the second insulator 76. The shield member 77 may be formed into a tubular shape and tightly made contact with the outer surface of the second insulator 76, or a tape-like or sheet-like member may be wound around the outer surface and tightly made contact with the outer surface.

In this embodiment, the high voltage coaxial complex conductive path 72 is available in two systems; however, without being limited to this, three systems, . . . , n systems may also be used. It is possible to obtain n systems by increasing circuits to the outside so that a coaxial single configuration is formed.

The wire harness 71 according to the third embodiment also exerts an effect similar to that of the wire harness 9 according to the first embodiment as a matter of course.

In the following, the wire harness and the method for installing the wire harness in the vehicle according to the embodiments will be summarized.

(1) The wire harness 9 according to the embodiments has the first installation part 81 that is provided as a portion to be installed first in the vehicle (hybrid motor vehicle 1), the flexible parts 82 and 83 that have flexibility and are provided at the end parts of the first installation part 81, and the sequential installation parts 84 and 85 that are provided so as to continue to the flexible parts 82 and 83 and to be installed sequentially in the vehicle after the installation of the first installation part 81.

The wire harness 9 is bent or folded at the positions of the flexible parts 82 and 83 and then set to the packed state using the packing member (the hook-and-loop fasteners 86), and in the packed state, the first installation part 81 is set to a state in which the first installation part 81 can be installed in the vehicle.

(2) In the wire harness 9 according to the embodiments, the flexible parts 82 and 83 are provided so as to be matched with the position of the through hole formed in the vehicle.

(3) In the wire harness 9 according to the embodiments, the water stop member (the grommet 19) being watertight to the flexible parts 82 and 83 and the through hole 11a is installed on the flexible parts 82 and 83 that are provided so as to be matched with the position of the through hole 11a.

(4) In the wire harness 9 according to the embodiments, the packing member is (the hook-and-loop fasteners 86 are) installed so as to straddle on the first installation part 81 and the sequential installation parts 84 and 85.

(5) In the wire harness 9 according to the embodiments, the lengths of the sequential installation parts 84 and 85 continuing to the flexible parts 82 and 83 are set to lengths so that the sequential installation parts 84 and 85 do not reach the floor 87 of the installation working site in the state in which the first installation part 81 is installed in the vehicle.

(6) The wire harness 9 according to the embodiments includes at least one conductive path (the high voltage conductive path 15) and a tube body shaped exterior member 16 made of resin into which the conductive path is inserted, and the exterior member 16 has flexible tube parts 27 having flexibility and inflexible tube parts 28 having flexibility lower than that of the flexible tube parts 27.

(7) In the wire harness 9 according to the embodiments, at least parts of the conductive path and the exterior member 16 are arranged in the vehicle underfloor 11.

(8) The method for installing the wire harness in the vehicle according to the embodiments includes a first step in which the first installation part 81 of the wire harness 9 is installed in the vehicle, a second step in which the packed state is released after the first step, and a third step in which the sequential installation parts 84 and 85 are installed in the vehicle after the second step.

(9) In the third step in the method for installing the wire harness in the vehicle according to the embodiments, the sequential installation parts 84 and 85 are installed in the vehicle using the flexibility of the flexible parts 82 and 83.

In addition to these, the present invention can be modified variously within a range not deviated from the gist of the present invention as a matter of course.

A wire harness in which heat reflecting parts for reflecting the heat from the outside are provided at a plurality of positions on the outer surface of the exterior member 16 according to the first to third embodiments is taken as a modification. In addition, a wire harness in which identification parts for identifying areas of high voltage are provided at a plurality of desired positions on the entire outer surface of the exterior member 16 is also taken as a modification.

With the wire harness and the method for installing the wire harness in a vehicle according to the present invention, the present invention is useful in that a wire harness and a method for installing the wire harness in a vehicle being capable of facilitating installation in the vehicle can be provided.

What is claimed is:

1. A wire harness comprising:
a first installation part that is provided as a portion to be installed first in a vehicle,
a flexible part that has flexibility, is provided at an end part of the first installation part,
a sequential installation part that is provided so as to continue to the flexible part and to be installed in the vehicle after the installation of the first installation part, wherein
the wire harness is bent or folded at a position of the flexible part and then set to a packed state using a packing member, and in the packed state, the first installation part is set to a state in which the first installation part can be installed in the vehicle, and
the packing member is installed so as to straddle on the first installation part and the sequential installation part.

2. The wire harness according to claim 1, wherein
the flexible part is provided so as to be matched with a position of a through hole formed in the vehicle.

3. The wire harness according to claim 2, wherein
a water stop member being watertight to the flexible part and the through hole is installed on the flexible part that is provided so as to be matched with the position of the through hole.

4. The wire harness according to claim 1, wherein
length of the sequential installation part continuing to the flexible part is set to length so that the sequential installation part does not reach a floor of an installation working site in a state in which the first installation part is installed in the vehicle.

5. The wire harness according to claim 1, comprising at least one conductive path and a tube body shaped exterior member made of resin into which the conductive path is inserted, and the exterior member has a flexible tube part having flexibility and an inflexible tube part having flexibility lower than that of the flexible tube part.

6. The wire harness according to claim 5, wherein
at least parts of the conductive path and the exterior member are arranged in an underfloor of the vehicle.

7. A method for installing a wire harness in a vehicle, the method comprising:
a first step in which a first installation part of the wire harness is installed in the vehicle, the wire harness including:
the first installation part that is provided as a portion to be installed first in a vehicle,
a flexible part that has flexibility and is provided at an end part of the first installation part, and
a sequential installation part that is provided so as to continue to the flexible part and to be installed in the vehicle after the installation of the first installation part, wherein
the wire harness is bent or folded at a position of the flexible part and then set to a packed state using a packing member, and in the packed state, the first installation part is set to a state in which the first installation part can be installed in the vehicle;
a second step in which the packed state is released after the first step; and
a third step in which the sequential installation part is installed in the vehicle after the second step.

8. The method for installing the wire harness in the vehicle according to claim 7, wherein
in the third step, the sequential installation part is installed in the vehicle using the flexibility of the flexible part.

9. A wire harness comprising:
a first installation part that is provided as a portion to be installed first in a vehicle, a flexible part that has flexibility, is provided at an end part of the first installation part and can be bent when the wire harness is arranged into the vehicle, and a sequential installation part that is provided so as to continue to the flexible part and to be installed in the vehicle after the installation of the first installation part, and a packing member, wherein the wire harness is bent or folded at a position of the flexible part and then set to a packed state using the packing member, and in the packed state, the first installation part is set to a state in which the first installation part can be installed in the vehicle, the first installation part includes an outer surface, a first portion of the outer surface lies adjacent the vehicle when the first installation part is installed in the vehicle, and the wire harness is bent or folded at a position of the flexible part and the packing member is connected to the first installation part and the sequential installation part in order to set the wire harness to a packed state, and in the packed state, the sequential installation part and the flexible part are positioned relative to the first installation part such that the first portion of the outer surface of the first installation part is unobstructed by the sequential installation part and the flexible part in order to set the first installation part to a state in which the first installation part can be installed in the vehicle.

* * * * *